Jan. 3, 1928.  
C. W. CROWELL  
1,655,356  
ILLUMINATION CONTROLLING DEVICE  
Filed Oct. 3, 1925  
2 Sheets-Sheet 1

Inventor  
Charles W. Crowell  
By Watson E. Coleman  
Attorney

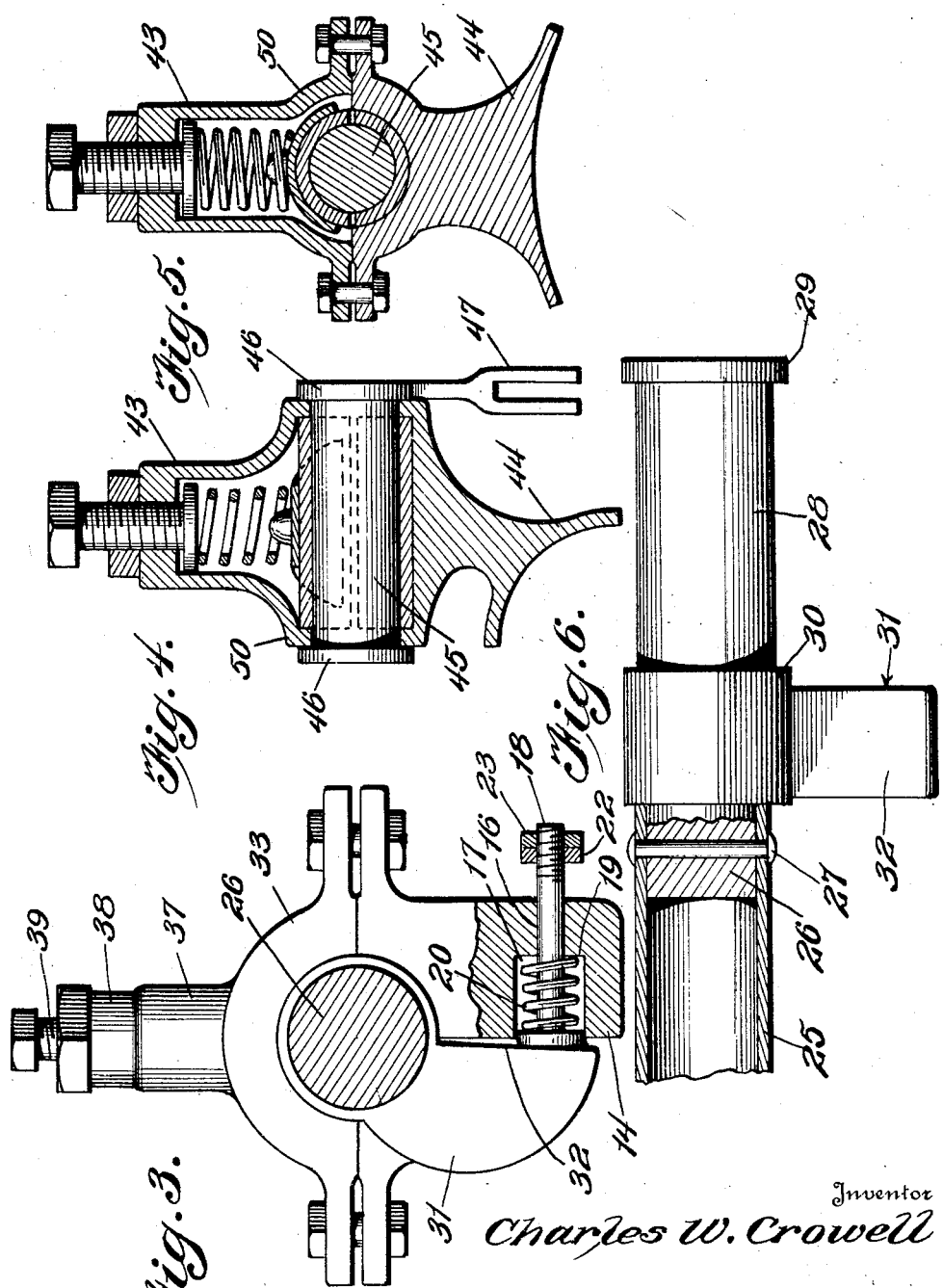

Patented Jan. 3, 1928.

1,655,356

UNITED STATES PATENT OFFICE.

CHARLES W. CROWELL, OF SALISBURY, NORTH CAROLINA.

ILLUMINATION-CONTROLLING DEVICE.

Application filed October 3, 1925. Serial No. 60,232.

This invention relates to illumination controlling devices and more particularly to a means for controlling the headlights of an automobile to prevent objectionable rays from being projected into the eyes of the drivers of oncoming vehicles or into the eyes of persons at the side of the road.

An important object of the invention is to provide a construction whereby the beam projected from the headlights is prevented at all times from reaching an elevation higher than a predetermined elevation and whereby during the ascent of acclivities, whether relatively short or long, the rays of the headlights are directed against the ground immediately in front of the vehicle, thereby preventing dazzling of persons surmounting the crest of the acclivity or in the path of the rays when the headlights are in normal position.

A further object of the invention is to produce a device of this character which may be relatively and cheaply produced and which is readily applied to the vehicle.

A still further object of the invention is to provide a device of this character which may be employed as a means for bracing the fenders of the vehicle as well as a means for supporting and controlling the headlights.

A further object of the invention is to provide in combination with a device of this character means for cutting off at all times the rays from the upper half of the headlight or modulating these rays so that they are not dazzling or objectionable.

These and other objects I attain by the construction shown in the accompanying drawings, wherein for the purpose of illustration is shown a preferred embodiment of my invention and wherein:—

Figure 3 is an end elevation partly broken away of the journal box showing the bumper connection between this journal box and the shaft;

Figure 4 is an enlarged detail sectional view taken through the shade;

Figure 5 is a transverse sectional view.

Figure 6 is a view partially in section of one end of the shaft showing the journal attached thereto;

Figure 1:
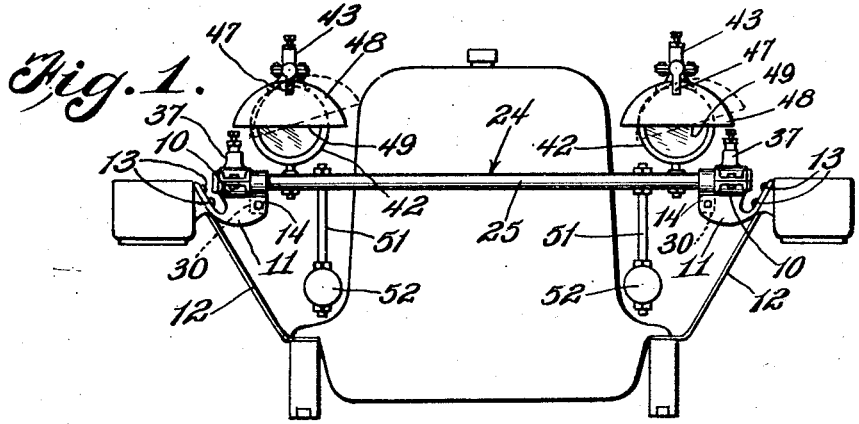
Figure 1 is a front elevation of a vehicle having a headlight mounting constructed in accordance with my invention and having these headlights provided with shields constructed in accordance with my invention, the shields being shown in solid lines in their normal position and in dotted lines in the position in which they assume when the vehicle is making a left hand turn.
Figure 2:
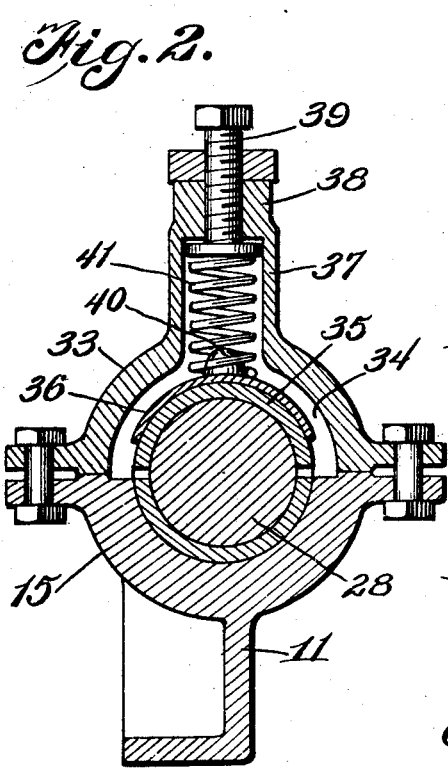
Figure 2 is a vertical sectional view through the journal box and its cap which supports the transverse bar or shaft.
Figure 7:
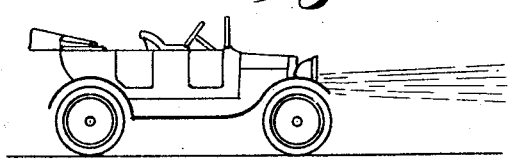
Figures 7, 8 and 9 are side elevations of a vehicle employing a headlight mounting constructed in accordance with my invention, illustrating the same when traveling on the level, uphill and downhill respectively.
Figure 8:
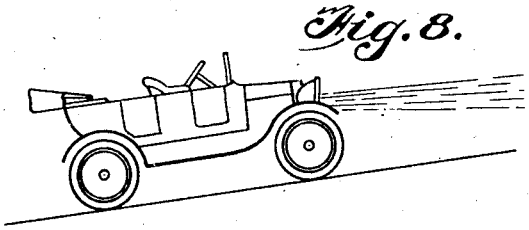
Figure 9:
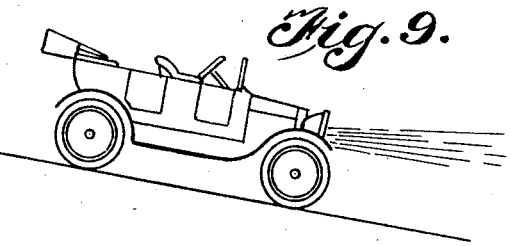

Referring now more particularly to the drawings, the numeral 10 indicates journal boxes, each preferably provided with a bracket extension 11 which is adapted to engage with the inner face of a fender apron 12 and be secured thereto, as indicated at 13. At its inner end, this journal box is formed with an inwardly projecting flange 14, the rear face of which is radial to and lies vertically below the axis of the bearing 15 formed in the upper surface of the journal box. The flange 14 forms a bumper block, as will hereinafter more particularly appear and has formed therethrough from front to rear a bore 16, the rear end of which is enlarged, as at 17. A bolt 18 has its head arranged at the rear face of the flange 14 and its shank directed through the bore 16 while between the shoulder 19 formed at the junction of the bores 16 and 17 and the head 18 a spring 20 is disposed. The shank 21 of this bolt has a relatively long thread having jamb and lock nuts 22 and 23 mounted thereon.

A transverse shaft 24 is provided, this shaft preferably consisting of a central tubular section 25 and end journal sections 26 secured to said tubular section, as at 27. These journal sections have a portion 28 constructed to fit the associated box 15 and at the ends of this bearing portion have flanges 29 and 30 preventing shifting of the journal sections within the boxes. The flange 30 is preferably formed integrally with a lug 31 which, when the journal section is in applied position, aligns with the flange 14 and this lug has its front face 32 radial to the axis of the journal section and adapted to coact with the rear face of the flange 14.

As a means for securing the shaft in position in the journal boxes, caps 33 are provided, each having formed therein an internal recess 34 of considerably greater diameter than the bearing section 28 of the shaft journal. This recess forms a housing for a block 35 preferably of wood against which is seated a metal follower 36. The upper faces of the caps 33 are each provided with a tubular boss 37, the upper end of which is closed, as at 38, and has directed therethrough an adjusting screw 39. Between the inner end of this adjusting screw 39 and a tit 40 formed on the metallic follower, a spring 41 is disposed by means of which pressure exerted by the follower upon the wood block 35 may be regulated and accordingly the pressure resisting rotation of the shaft is regulated.

The shaft 24 provides a mounting for the headlights 42 which may be of the usual construction but which are preferably constructed in accordance with my prior Patent No. 1,601,111 dated September 28, 1926, for headlights. In this application, I have disclosed a headlight which is of the usual construction with the exception of the fact that is has secured thereto at the upper end thereof and immediately above the horizontal axis of the headlight a journal box 43 having an attaching bracket 44 by means of which it is secured. This journal box has mounted therein a journal 45 flanged at its ends, as at 46, to prevent longitudinal movement thereof within the bearing. Formed integrally with one of these flanges 46 is a jaw 47 within which is secured a glass plate 48 preferably of translucent glass and substantially in the form of a semi-circle having a diameter considerably greater than the diameter of the lens of the headlight. The lower edge 49 of this plate is disposed in a plane including the horizontal axis of the headlight when said lower edge is horizontally disposed. A cap 50 is provided for the journal box similarly constructed to the caps of the journal boxes 10 so that regulation of the swinging movements of the plate 48 may be provided. While I have above referred to this plate as being of translucent material, it is to be understood that this plate may be constructed in any manner as long as it modulates the beam passing therethrough to render the same non-dazzling. The shaft 24 likewise provides a mounting for depending arms 51 upon which are adjustably mounted pendulum weights 52.

In the operation of the device, it will, of course, be understood that the shaft 24 is free to rotate through certain limits and as the limit of movement merely limits this rotation when the headlights are at a predetermined position where their beams do not reach a point above a given level above the ground at a predetermined distance in advance of the vehicle, the headlight beam may never be projected above such level. When the vehicle starts to ascend a hill, the pendulum weights will, of course, move rearwardly with the result that the beam is caused to incline toward the ground and not project in alignment with the inclination of the vehicle as in the ordinary headlight mounting. This is true whether the acclivity is relatively short or long or whether the vehicle is merely temporarily lifted by engagement with some obstruction upon the road. When, however, the vehicle is traveling down-hill so that the inclination is from back to front of the vehicle, the rays are prevented from horizontal projection by engagement of the lug 32 with the bumper element 14 and are maintained in alignment with the vehicle as though the vehicle were traveling horizontally, thus keeping the rays upon the road where they are needed. The plate 48 will, of course, at all times, during straight ahead travel, maintain its lower edge in horizontal position, acting as a pendulum and for this reason will at all times cut off the upper half of the rays from the headlight or modulate the same to render these rays non-dazzling. It is pointed out that when the vehicle is making a turn, due to the present practice of banking the roads at the turn, such a transverse inclination of the vehicle takes place and accordingly with the ordinary headlight structure, an increased and more dazzling ray is passed from the headlight traveling directly across the road and accordingly interferes with the operation of vehicles passing in the opposite direction. In my device, however, this tendency of the rays to increase in strength is eliminated. It is pointed out that the structure hereinbefore described, while described and illustrated as applied to the headlights of an automobile could quite as conveniently be applied to the headlight of a locomotive and would perform the same functions in exactly the same manner. It will thus be seen that by this combination, the passage of objectionable rays above a predetermined level or in a direction where they are not needed and where they may be undersirable is prevented and the light is at all times kept at a point where it is most needed.

Since the construction, as hereinbefore set forth is obviously but a preferred embodiment of my invention, I do not wish to be understood as limiting myself to such specific structure except as hereinafter claimed.

I claim:—

1. In combination with a vehicle, a journal carried thereby, a shaft mounted in said journal, a headlight carried by the shaft, means limiting rotation of the shaft when the beam from the headlight is horizontally directed while the vehicle is horizontally disposed, a pendulum rotating the shaft when the forward end of the vehicle is elevated to maintain the beam from the headlight in horizontal position and adjustable means in said journal box applying pressure to the journal to thereby frictionally resist rotation of the shaft, said means limiting rotation of the shaft comprising coacting bumper elements carried by the shaft and journal.

2. In combination with a vehicle, a journal carried thereby, a shaft mounted in said journal, a headlight carried by the shaft, means limiting rotation of the shaft when the beam from the headlight is horizontally directed while the vehicle is horizontally disposed, a pendulum rotating the shaft when the forward end of the vehicle is elevated to maintain the beam from the headlight in horizontal position and adjustable means in said journal box applying pressure to the journal to thereby frictionally resist rotation of the shaft, said means limiting rotation of the shaft comprising coacting bumper elements carried by the shaft and journal, one of said bumper elements having an adjustable spring-pressed cushioning element for engagement with the other of the bumper elements.

In testimony whereof I hereunto affix my signature.

CHARLES W. CROWELL.